United States Patent
Ohkura et al.

(10) Patent No.: US 6,347,400 B1
(45) Date of Patent: Feb. 12, 2002

(54) RECEIVING APPARATUS AND DISPLAY CONTROL METHOD

(75) Inventors: Yukiko Ohkura, Tokyo; Tetsuya Kohno, Kanagawa, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/950,567

(22) Filed: Oct. 15, 1997

(30) Foreign Application Priority Data

Oct. 16, 1996 (JP) .............................................. 8-293174

(51) Int. Cl.$^7$ ........................... H04N 5/445; G06F 3/00; G06F 13/00
(52) U.S. Cl. .............................. 725/60; 725/40; 725/39
(58) Field of Search ........................... 455/4.2, 5.1, 6.1, 455/6.2, 6.3, 3.1; 345/327, 372; 348/10, 7, 12, 13, 6, 906; 725/60, 40, 43, 44; H04N 2/10, 7/04, 1/00, 1/02, 1/14

(56) References Cited

U.S. PATENT DOCUMENTS

| | | | | |
|---|---|---|---|---|
| 5,594,509 A | * | 1/1997 | Florin et al. ................. | 348/906 |
| 5,657,072 A | * | 8/1997 | Aristides et al. ............. | 455/3.1 |
| 5,781,246 A | * | 7/1998 | Alten et al. .................. | 348/906 |
| 5,801,787 A | * | 9/1998 | Schein et al. ................ | 348/569 |
| 5,805,235 A | * | 9/1998 | Bedard ........................ | 348/906 |
| 5,828,420 A | * | 10/1998 | Marshall et al. ............. | 348/906 |
| 6,075,575 A | * | 6/2000 | Schein et al. ................ | 348/906 |
| 6,118,492 A | * | 9/2000 | Milnes et al. ................ | 348/906 |

* cited by examiner

Primary Examiner—Andrew Faile
Assistant Examiner—Vivek Srivastava
(74) Attorney, Agent, or Firm—Frommer Lawrence & Haug LLP; William S. Frommer; Glenn F. Savit

(57) ABSTRACT

A time display bar is displayed in a purchasing picture, and an elapsed time indication bar for indicating an elapsed broadcast time of a selected PPV program with respect to its total broadcast time is displayed in the time display bar. By looking at the time display bar, a user can immediately and visually recognize the progress in time of the selected PPV program at the present time. Where the selected PPV program accommodates NVOD, time display bars for candidate PPV programs having the same contents as the selected PPV program and to be broadcast on different channels are also displayed in the purchasing picture. This provides more effective user interface.

10 Claims, 8 Drawing Sheets

FIG. 5A

| DATE | TIME | PROGRAM | | | GENRE |
|---|---|---|---|---|---|
| 3 SUN. | 3 | ⑩ HBO | PROGRAM A | 8:00 - 9:30 | 11CH |
| 4 MON. | 6 | ⑪ NBC | PROGRAM B | 8:00 - 9:00 | ALL |
| 5 TUE. | 8 | ⑫ ESPN | PROGRAM C | 8:00 - 9:30 | |
| 6 WEDS. | 9 | ⑬ ABC | PROGRAM D | 8:05 - 11:00 | MOVIES |
| 7 THUR. | 12 | ⑭ CNN | PROGRAM E | 8:10 - 9:00 | |
| 8 FRI. | 15 | ⑰ MSG | PROGRAM F | 8:30 - 9:00 | NEWS |
| 9 SAT. | 18 | ⑱ TBS | PROGRAM G | 8:30 - 9:00 | BOOK-MARK |
| | 21 | ⑳ MTV | PROGRAM H | 8:30 - 10:00 | |
| | 24 | | | | |

FIG. 5B

| DATE | TIME | PROGRAM | | | GENRE |
|---|---|---|---|---|---|
| 3 SUN. | 3 | ⑪ NBC | PROGRAM I | 9:00 - 9:30 | 11CH |
| 4 MON. | 6 | ⑭ CNN | PROGRAM J | 9:00 - 10:00 | ALL |
| 5 TUE. | 9 | ⑰ MSG | PROGRAM K | 9:00 - 10:00 | |
| 6 WEDS. | 12 | ⑱ TBS | PROGRAM L | 9:00 - 9:30 | MOVIES |
| 7 THUR. | 15 | ⑩ HBO | PROGRAM M | 9:30 - 11:30 | |
| 8 FRI. | 18 | ⑪ NBC | PROGRAM N | 9:30 - 10:30 | NEWS |
| 9 SAT. | 21 | ⑫ ESPN | PROGRAM O | 9:30 - 10:30 | BOOK-MARK |
| | 24 | ⑱ TBS | PROGRAM P | 9:30 - 11:00 | |

FIG. 5C

| DATE | TIME | PROGRAM | | | GENRE |
|---|---|---|---|---|---|
| 3 SUN. | 3 | ⑩ HBO | PROGRAM Q | 24:00 - 1:30 | 11CH |
| 4 MON. | 6 | ⑪ NBC | PROGRAM R | 24:00 - 1:50 | ALL |
| 5 TUE. | 9 | ⑫ ESPN | PROGRAM S | 24:04 - 1:30 | |
| 6 WEDS. | 12 | ⑬ ABC | PROGRAM T | 24:05 - 1:00 | MOVIES |
| 7 THUR. | 15 | ⑭ CNN | PROGRAM U | 24:10 - 2:20 | |
| 8 FRI. | 18 | ⑰ MSG | PROGRAM V | 24:30 - 1:00 | NEWS |
| 9 SAT. | 21 | ⑱ TBS | PROGRAM W | 24:30 - 1:00 | BOOK-MARK |
| | 24 | ⑳ MTV | PROGRAM X | 24:45 - 2:00 | |

FIG. 5D

| DATE | TIME | PROGRAM | | | GENRE |
|---|---|---|---|---|---|
| 4 MON. | 1 | ⑬ ABC | PROGRAM T | 1:00 - 3:00 | 11CH |
| 5 TUE. | 6 | ⑰ MSG | PROGRAM V | 1:00 - 3:00 | ALL |
| 6 WEDS. | 9 | ⑱ TBS | PROGRAM W | 1:00 - 2:00 | |
| 7 THUR. | 12 | ⑩ HBO | PROGRAM Q | 1:30 - 3:30 | MOVIES |
| 8 FRI. | 15 | ⑫ ESPN | PROGRAM S | 1:30 - 3:30 | |
| 9 SAT. | 18 | ⑱ TBS | PROGRAM W | 2:00 - 4:00 | NEWS |
| 10 SUN. | 21 | ⑳ MTV | PROGRAM X | 2:00 - 3:00 | BOOK-MARK |
| | 24 | ⑭ CNN | PROGRAM U | 2:20 - 3:00 | |

RECEIVING APPARATUS AND DISPLAY CONTROL METHOD

BACKGROUND OF THE INVENTION

The present invention relates to a receiving apparatus and a display control method and, for instance, to a receiving apparatus and a display control method which enable reception of a chargeable program and display output of information relating to the chargeable program.

In recent years, systems have spread in which a television signal is transmitted in the form of a digital signal from satellites such as a broadcast satellite and a communication satellite and such a broadcast signal is received and viewed in each home, for instance. Since such a broadcast system can secure as many as close to 150 channels, for instance, it can broadcast many more programs than existing ground wave broadcast systems, for instance.

In such broadcast systems, to allow reliable selection of a desired program from among a number of programs, it is proposed to transmit an electronic program guide (EPG) which contains programs scheduled to be broadcast. The receiving side receives and displays the EPG and selects a desired program by checking it.

Further, such broadcast systems are scheduled to broadcast, as part of broadcast programs, chargeable programs called pay-per-view programs (hereinafter abbreviated as "PPV programs"). A system for providing PPV programs is one form of what is called a video-on-demand system which allows a user to immediately view a desired program or the like upon his request.

A PPV program is transmitted from the transmission side in a scrambled state. When a user performs a procedure for purchasing a desired program by a given manipulation, the receiving apparatus side, for instance, cancels the scrambled state of a PPV program to allow viewing of the purchased program.

Generally speaking, when a user determines whether to purchase a PPV program, the most important factor is how long a PPV program that the user intends to view has been broadcast from its start time.

That is, in a state that a subject PPV program has been broadcast for only a short time or its broadcast start time has not yet occurred, a user can recognize the content of the program completely or almost completely if he purchases and starts viewing the PPV program right away. On the other hand, in a state that a subject PPV program has been broadcast for a certain time, it is difficult for the user to recognize the content of the remaining part of the PPV program if he purchases and starts viewing it at that point; it is not very meaningful for the user to purchase this PPV program.

For example, it is conceivable to display, by characters, the broadcast start and end times of each PPV program as time-related information of PPV programs in a purchase guide picture for purchasing of the PPV programs.

In this case, for example, a user determines whether to purchase a subject PPV program by recognizing how long it has proceeded in time at the present time by referring to its broadcast start and end times that are character-displayed on a purchasing picture and checking the present time. However, in this method, it is difficult for a user to recognize quickly and sensibly the degree of progress in time until the present time of a PPV program with respect to its total broadcast duration which he should recognize most appropriately. There may occur a case that a user makes an erroneous manipulation of purchasing a PPV program in spite of the fact that it has been broadcast for a certain time, with an erroneous judgment that there still remains an ample broadcast time.

In view of the above, it is preferable to improve the ease of operation of an interface that is used in purchasing a PPV program, that is, to improve a purchasing picture so that a user can recognize as sensibly as possible the degree of progress in time of a PPV program until the current time with respect to its total broadcast duration.

Further, the above-mentioned broadcast systems include systems that perform a service called "near video on demand" (hereinafter abbreviated as NVOD) as well as a PPV programs providing service. For example, the NVOD is a service in which the same broadcast program is broadcast several times with delays in start time by using a plurality of channels. With this service, even if a user fails to view, from the start, a desired program that is broadcast on a certain channel, he will be able to view it from the start with a waiting time of several minutes to tens of minutes, for instance, by selecting another NVOD channel.

Therefore, for NVOD-type PPV programs, it is preferable to construct a more effective user interface by adapting the above-mentioned purchasing picture to NVOD, that is, by adapting it so that information relating to PPV programs that are or will be broadcast on the other channels are displayed there.

SUMMARY OF THE INVENTION

An object of the present invention is therefore to provide a user interface that a user can use more easily in purchasing a program.

According to the invention, there is provided a receiving apparatus which receives transmitted program information of a plurality of programs together with transmitted video and audio signals thereof, comprising selecting means for selecting a desired program from among the plurality of programs; and chargeable program information display control means for displaying information relating to a chargeable program that is selected by a given manipulation from among programs that are rendered selectable by the selecting means, the chargeable program information display control means presenting a graphic display indicating progress in time of the selected chargeable program at a present time.

According to another aspect of the invention, there is provided a display control method for a receiving apparatus which receives transmitted program information of a plurality of programs together with transmitted video and audio signals thereof and displays program information of a selected program, the display control method comprising the steps of judging whether a chargeable program has been selected by a tuner; and presenting a graphic display indicating progress in time of the selected chargeable program at a present time if it is judged that the chargeable program has been selected.

With the above constitution of the invention, the progress in time of, for instance, a PPV program (chargeable program) is graphically displayed as PPV-program-related information in a PPV program purchasing picture. Therefore, for instance, an elapsed broadcast time of the PPV program at the present time with respect to its total broadcast time can be displayed so as to be recognized visually.

Where a selected PPV program accommodates NVOD, such information as the progress in time of each of PPV programs having the same contents as the selected PPV program and to be broadcast on different channels can also be displayed in a purchasing picture, for instance.

BRIEF DESCRIPTION OF THE DRAWINGS

FIGS. 5A–5D illustrate examples of electrical program guides that are actually displayed on the screen of a monitor device;

FIGS. 6A-1 to 6E illustrate display examples of electrical program guides between which switching is made by manipulations on the remote controller;

DETAILED DESCRIPTION OF THE PREFERRED EMBODIMENT

An embodiment of the present invention will be hereinafter described with reference to FIGS. 1–9. It is assumed that a receiving apparatus according to this embodiment has an electronic program guide display control device which can perform electronic program guide display based on program guide information that is transmitted superimposed on broadcast waves.

Figure 1:
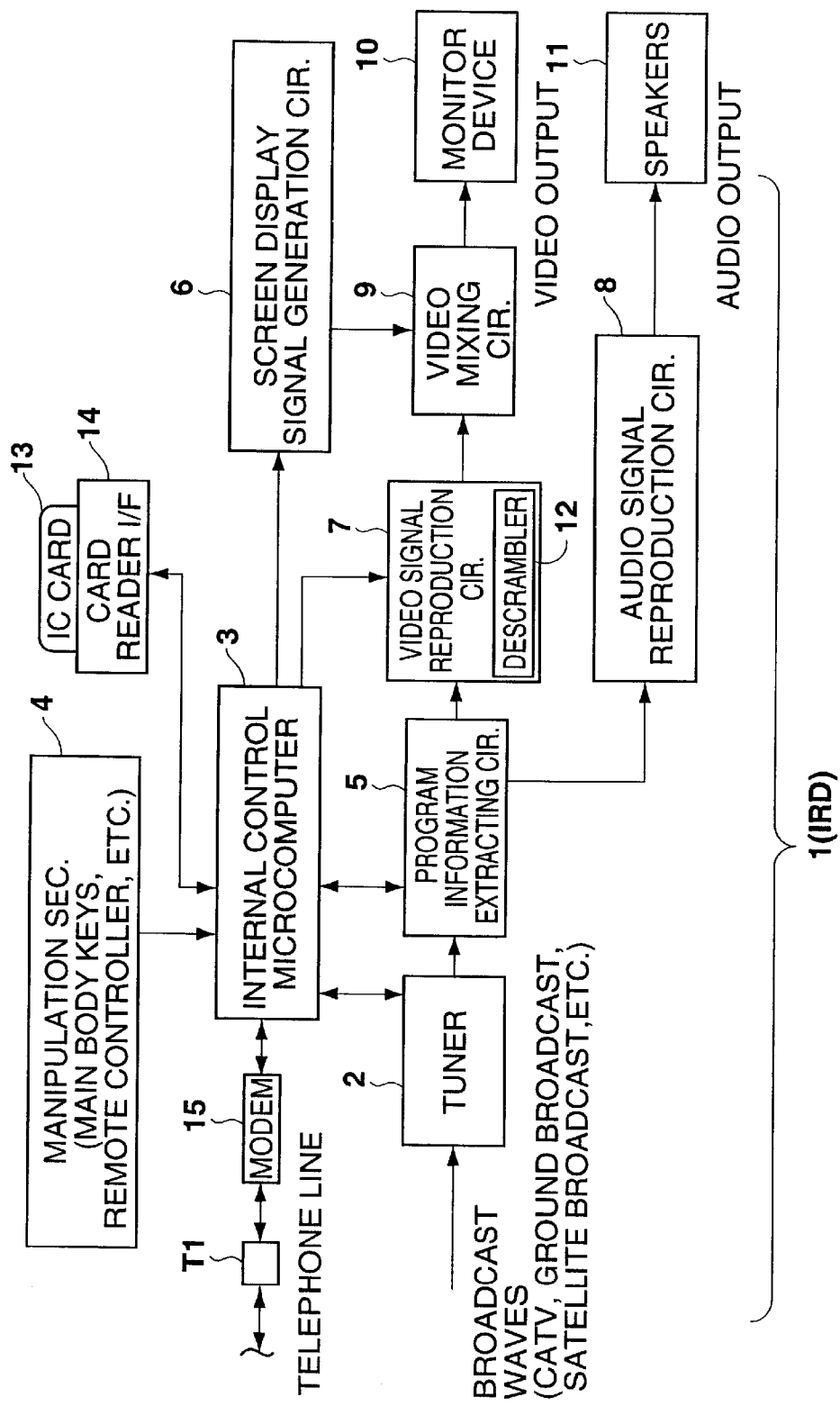
FIG. 1 is a block diagram showing a configuration example of a receiving apparatus according to an embodiment of the present invention.

This embodiment will be described in order of the following items:

1. Configuration of receiving apparatus of embodiment
2. Configuration of remote controller
3. Mode of electrical program guide display of embodiment
4. Display mode example of PPV program purchasing picture of embodiment
5. Process of program purchasing based on PPV program purchasing picture of embodiment 1. Configuration of Receiving Apparatus of Embodiment FIG. 1 is a block diagram showing a configuration example of a receiving apparatus according to the embodiment of the invention. In this receiving apparatus, broadcast waves received by an antenna or the like are supplied to a tuner 2. Data of program guide information (EPG data) is superimposed on the broadcast waves according to a predetermined format.

Although the receiving apparatus of the embodiment accommodates digitally transmitted satellite broadcast waves as the above-mentioned broadcast waves, in the invention the broadcast waves may also be cable (CATV) broadcast waves or ground waves. Broadcast waves to be received may even be analog signals. The internal configuration of the tuner 2 is adapted properly to the type of broadcast waves to be received.

The tuner 2 is so constructed as to perform tuning processing under the control of an internal control microcomputer 3 for controlling the entire receiving apparatus. Outputs of the tuner 2 are supplied to a program information extraction circuit 5. The outputs of the tuner 2 include program information as well as video/audio information.

Figure 4:
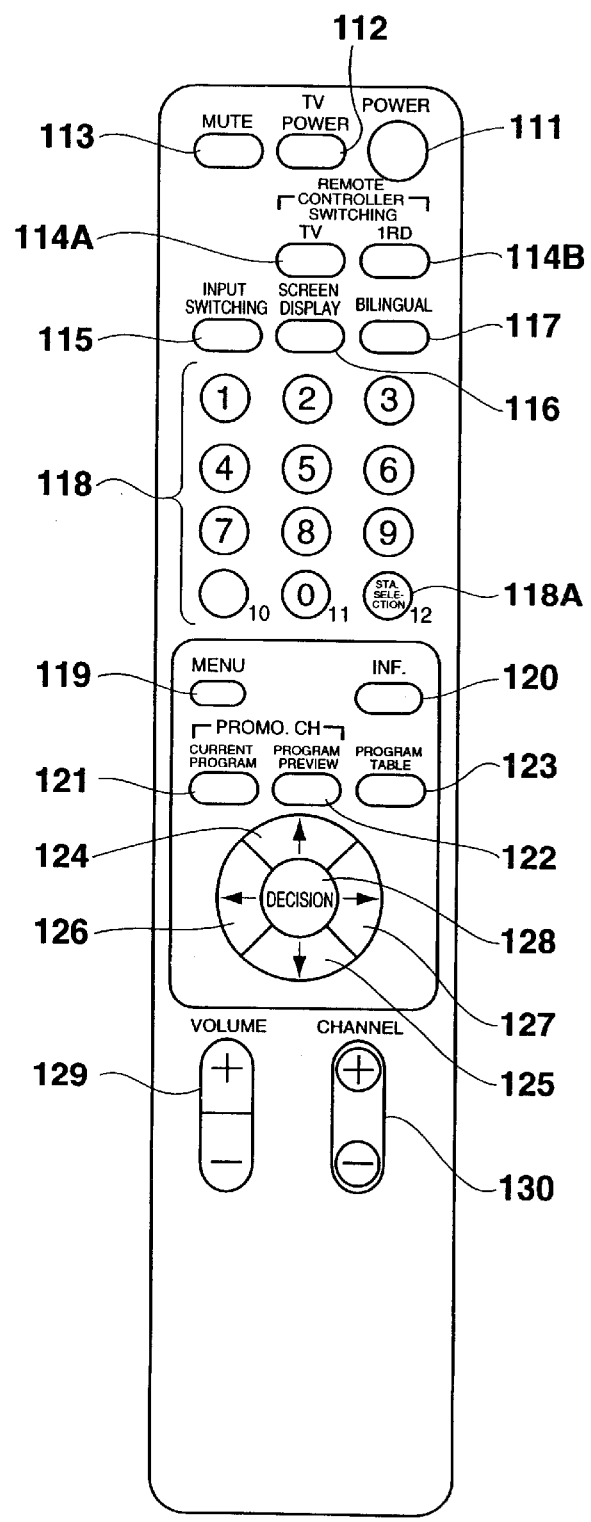
FIG. 4 is a plan view showing a configuration example of a remote controller according to the embodiment.

The internal control microcomputer 3 is so constructed as to control the tuner 2, the program information extraction circuit 5, and a screen display signal generation circuit 6 in accordance with a manipulation command coming from a manipulation section 4 (constituted of manipulation switches provided on the apparatus main body, a remote controller 4A shown in FIG. 4, or the like) that is manipulated by a user. A detailed internal configuration of the internal control microcomputer 3 will be described later with reference to FIG. 2.

The program information extraction circuit 5 is so constructed as to extract program information data that is included in outputs of the tuner 2 under the control of the internal control microcomputer 3 and supplies the extracted data to the internal control microcomputer 3. The program information data is converted by the internal control microcomputer 3 into display picture data (screen display data), which is supplied to the screen display signal generation circuit 6.

Among the outputs of the tuner 2 that have been input to the program information extraction circuit 5, video data and audio data are supplied to a video signal reproduction circuit 7 and an audio signal reproduction circuit 8, respectively. The video signal reproduction circuit 7 performs necessary signal processing on the supplied video data and supplies resulting data to a video mixing circuit 9.

A descrambler 12 is provided in the video signal reproduction circuit 7. The descrambler 12 is so constructed as to receive video data of a chargeable channel, a PPV program, or the like that has been transmitted in a scrambled state and to descramble it into an output-possible state.

An on/off control on the function of the descrambler 12 is performed by the internal control microcomputer 3 based on data stored in an IC card (described later). For example, the internal control microcomputer 3 controls the descrambler 12 so that it works when a PPV program is purchased by a user, an already subscribed chargeable channel is selected, or in a like case. The internal control microcomputer 3 also controls the descrambler 12 so that it temporarily works in displaying a picture for "preview" (described later).

The screen display signal generation circuit 6 is so constructed as to generate a picture signal (screen display signal) of program information based on picture data of screen display data (program information data) supplied from the internal control microcomputer 3 and supplies the generated picture signal to the video mixing circuit 9.

The video signal reproduction circuit 7 reproduces a video signal from video data that is supplied from the program information extraction circuit 5 and supplies the video signal to the video mixing circuit 9.

The video mixing circuit 9 mixes the video signal that is supplied from the video signal reproduction circuit 7 with the picture signal (screen display signal) of program information that is supplied from the screen display signal generation circuit 6, and supplies a mixed signal as a video output to a monitor device (television receiver) 10.

Similarly, the audio signal reproduction circuit 8 reproduces audio signals from audio data that is supplied from the program information extraction circuit 5, and outputs the audio signals (audio outputs) to speakers 11.

The receiving apparatus of the embodiment is equipped with an IC card 13 that is necessary for a user to purchase and view a PPV program or subscribe and view a chargeable program.

Although the IC card 13 is provided so as to be detachable from the receiving apparatus main body, it is usually used in a state that it is mounted in the receiving apparatus main body. For example, as shown in FIG. 1, the IC card 13 is connected to the internal control microcomputer 3 via a card reader interface 14.

For example, the IC card 13 stores an individually different ID number and information of an individual key. The IC card 13 also stores a work key that is decoded, by using the individual key, from control information for scramble cancellation that is transmitted being superimposed on a broadcast wave. To display a program of a certain chargeable channel or a chargeable program, the internal control microcomputer 3 supplies the IC card 13 with control information that is transmitted in association with that program. The IC card 13 collates a content of the control information with subscription information that has been captured in advance. If the channel or program concerned is a subscribed one, the IC card 13 decodes a scramble key that is included in the control information by using the work key. For example, the scramble key is transferred from the internal control microcomputer 3 to the descrambler 12. Thus, the descrambler 12 is allowed to perform descrambling.

In the case of subscription of PPV programs, data of viewing history information is stored in the IC card 13. Under the control of the internal control microcomputer 3, the viewing history data is uploaded to a viewing information processing/collection system from a modem 15 via a telephone modular jack T1 and a telephone line at regular intervals, for instance. The viewing information processing/collection system side charges the user for purchased PPV programs based on the uploaded viewing history data of the programs.

Next, the internal configuration of the internal control microcomputer 3 shown in FIG. 1 will be described with reference to FIG. 2. A CPU (central processing unit) 20 receives a manipulation command or data from the manipulation section 4, the tuner 2, and the program information extraction circuit 5 via an input/output interface 23.

The CPU 20 is so constructed as to execute necessary processes in response to data or a manipulation command that is input from the input/output interface 23 based on various programs included in a control program block 21.

The control program block 21 includes the following programs. A manipulation input control program 21A is a program for executing a process corresponding to a manipulation command that is input from the manipulation section 4. A tuning control program 21B is a program used for a control of a tuning process, a judgment on a tuning result, and other processes.

A program information extraction control program 21C is a program for controlling a program information extraction process of the program information extraction circuit 5. A screen display data generation program 21D is a program for generating screen display data of program information based on program information data that is supplied from the program information extraction circuit 5. In this embodiment, the screen display data generation program 21D is so constructed as to be able to generate also display data of purchasing pictures (first and second purchasing pictures; described later) for PPV program purchasing based on the program information data.

A screen display signal generation control program 21E is a program for controlling a process of the screen display signal generation circuit 6.

A chargeable program purchase management program 21F is a program used for a control relating to subscription and purchase of a chargeable channel and a PPV program. For example, the above-mentioned process of executing scramble cancellation by obtaining a scramble key by using the IC card 13 is based on the chargeable program purchase management program 21F.

Further, a process (described later) for purchasing a PPV program by displaying a PPV program purchasing picture is also realized by the chargeable program purchase management program 21F. A process for the display itself of a PPV program purchasing picture is realized by the screen display data generation program 21D and the screen display signal generation control program 21E.

Various storage areas are set in a data block 22. A cylinder EPG database 22A, screen display data 22B, and other data are stored in the data block 22. The cylinder EPG database 22A is a database of a cylinder EPG, which will be described later with reference to FIG. 3. The screen display data 22B, which is generated by execution of the screen display data generation program 21D, is data for screen display of a cylinder EPG that is written to a VRAM (video random access memory) of the data block 22. In this embodiment, display data of PPV program purchasing pictures (a first purchasing picture 200 and a second purchasing picture 200A; described later) are generated, also as screen display data 22B, by the screen display data generation program 21D.

Figure 3:
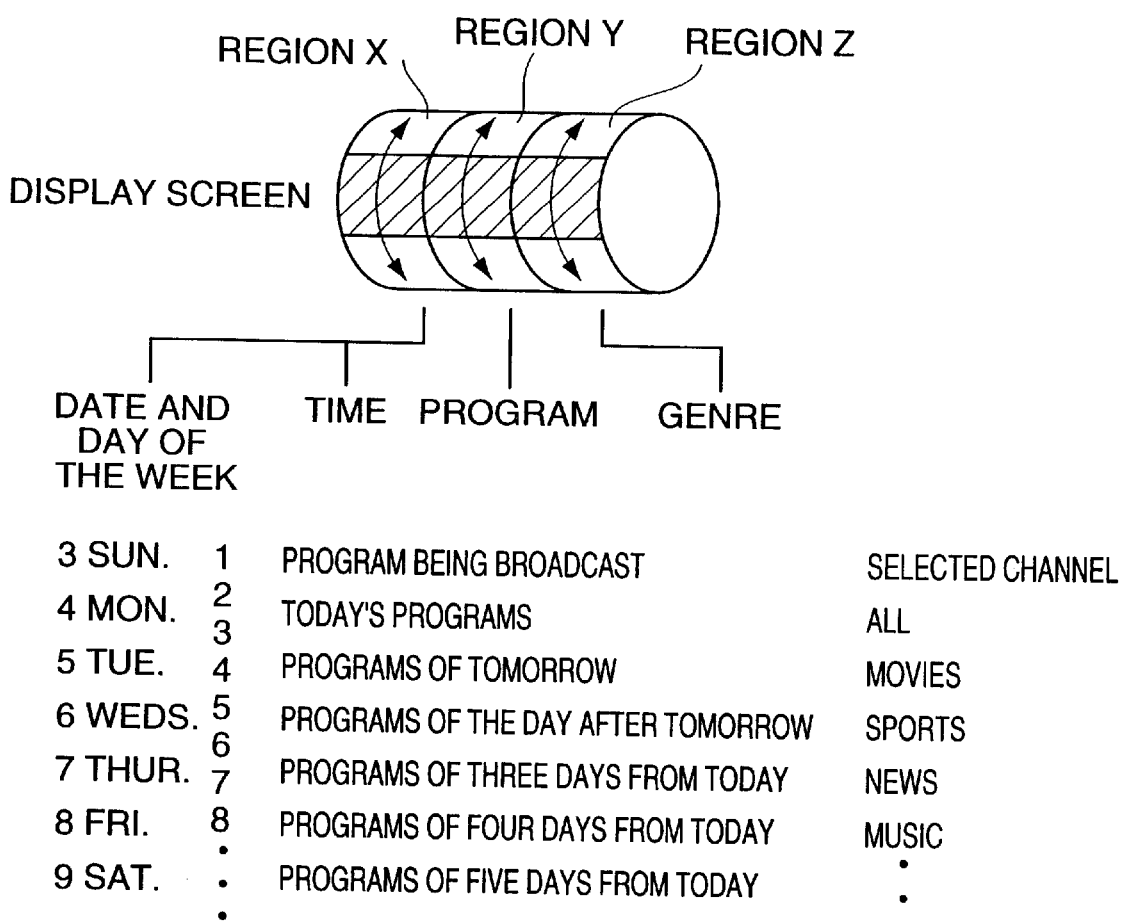
FIG. 3 conceptually shows an electrical program guide (cylinder EPG) according to the embodiment.

Next, a description will be made of a basic EPG display concept of this embodiment which is realized by provision of the cylinder database 22A. FIG. 3 conceptually shows an EPG according to the embodiment. In the EPG of the embodiment, the circumferential surface of a cylinder corresponding to the screen (display screen) of the monitor device 10 is sectioned into three regions X, Y, and Z by planes perpendicular to the horizontal central axis (that is, the screen of the display device 10 is sectioned in the vertical direction). The three regions X, Y and Z are classified as follows.

In the left-hand region X among the three regions of the cylinder shown in FIG. 3, dates of one week, corresponding days of the week, and time points are arranged in the vertical direction (circumferential direction) in order of elapsing of time.

In the central region Y among the three regions, titles or the like of programs being broadcast or to be broadcast in the future are arranged in the vertical direction (circumferential direction) in order of channel numbers and broadcast start times.

In the right-hand region Z among the three regions, genres of programs (classification items are "selected channel," "all," "movies," "sports," "news," "music," etc.) are arranged in the vertical direction (circumferential direction). The "selected channel" is information of the channel number of a program that is currently selected by the tuner 2 and displayed on the monitor device 10 in the electronic program guide display control device of the embodiment.

A user can have desired information displayed on the display screen (hatched in FIG. 3) by rotating the respective regions X, Y, and Z by manipulating the manipulation section 4 (for instance, the remote controller 4A shown in FIG. 4).

As described above, in the EPG (electronic program guide) of the embodiment, the display mode is employed in which the cylinder is sectioned into a plurality of regions, the respective regions are assigned dates and time, programs, and genres, and the respective regions are made rotatable. In the following description, the EPG having such a display mode is called "cylinder EPG."

2. Configuration of Remote Controller

A configuration example of the manipulation section 4 (see FIG. 1) will be described below. FIG. 4 is a plan view showing a configuration example of a remote controller 4A, which corresponds to the manipulation section 4 shown in FIG. 1.

A power button switch 111 and a TV power button switch 112 are manipulated to turn on or of f the power of the receiving apparatus (IRD: integrated receiver and decoder) 1 and the television monitor device 10, respectively.

Muting is effected by manipulating a mute button switch 113, and the muting is canceled by manipulating it again.

A TV changeover button switch 114A and an IRD changeover button switch 114B are manipulated to switch the functions of the switches of the remote controller 4A between the functions corresponding to the television monitor device 10 and those corresponding to the receiving apparatus 1.

An input changeover button switch 115 is manipulated to switch among input sources of the television monitor device 10. A screen display button switch 116 is manipulated to have a channel number etc. (including a station logo and a title) displayed on the television display device 10, and such a display disappears when it is manipulated again. A bilingual button switch 117 is manipulated to switch output sounds of the speakers 11 among a main sound, an auxiliary sound, and the main sound plus the auxiliary sound (or Japanese, a foreign language, and Japanese plus the foreign language) in receiving a bilingual or multivoice broadcast.

Numeral button switches 118 having numbers 0 to 9 are manipulated to input numerals of respective buttons. A station selection button switch 118A is manipulated after manipulation of some of the numeral button switches 118 to indicate that the input of a number has completed and that the input number represents a channel.

When the TV changeover button switch 114A has been manipulated and hence the remote controller 4A has been set as a remote controller of the television monitor device 10, the button located under the "7" button of the numeral button switches 118 represents "10," the button bearing numeral "0" represents "11," and the selection button switch 118A represents "12." A program of a broadcasting station (channel) for which a depressed button is set is displayed on the television monitor device 10.

A menu button switch 119 is manipulated to have an electronic program guide or a menu picture (not shown) for various settings of the IRD 1 displayed on the television monitor device 10. An information button switch 120 is manipulated to have an information picture (not shown) displayed.

A current program button switch 121 and a program preview button switch 122 are used to select a promotion channel, and are manipulated to cause a program that is currently broadcast and a preview of a program to be broadcast in the future, respectively, to be displayed. A program table button switch 123 is manipulated to cause an EPG (program table) as shown in FIGS. 5A–5D to be displayed.

A select button (decision key) switch 128 is so constructed so as to allow vertical depressed (selecting manipulation) with respect to the top face of the remote controller 4A. An up button switch (up key) 124, a down button switch (down key) 125, a left button switch (left key) 126, and a right button switch (right key) 127 are manipulated to move cursors (for instance, cursors 100X1, 100X2, 100Y, and 100Z shown in FIGS. 5A–5D) etc. that are displayed on the screen upward, downward, leftward, and rightward, respectively.

A volume button switch 129 and a channel up/down button switch 130 are manipulated to increase or decrease the sound volume and the channel number, respectively.

3. Mode of Electronic Program Guide Display of Embodiment

The mode of the electronic program display according to the embodiment will be described below with reference to FIGS. 5A–5D and FIGS. 6A-1 to 6E.

FIGS. 5A–5D show examples of program tables (electronic program guides) that are displayed on the screen of the television monitor device 10 as specific display modes of the cylinder EPG shown in FIG. 3.

In the program tables shown in FIGS. 5A–5D, a region X1 where dates and days of the week are displayed and a region X2 where time is displayed are further separated from each other.

The cursors 100X1, 100X2, 100Y, and 100Z that can be moved by a user by manipulating the remote controller 4A (manipulation section 4) shown in FIG. 4 are displayed in the regions X1, X2, Y, and Z, respectively. In this embodiment, an item of a selected channel region $Z_{CH}$ as information relating to a broadcast channel is provided in the region Z for displaying genres.

In the display states of FIGS. 5A–5D, the region Y is selected and only the cursor 100Y in the region Y can be moved by a manipulation (the cursors in the other regions are not movable by a manipulation). That is, only the region Y is highlighted and the other regions are somewhat darkened.

For example, referring to FIG. 5A, in the region X1 where dates are displayed, the cursor 100X1 is located at the third day, Sunday.

In the region Z where genres are displayed, the cursor 100Z is located at "all." Therefore, titles of all programs of any genres that are or will be broadcast after AM 8:00 of the third day, Sunday are displayed in the region Y together with their channel numbers and broadcast times. Titles of as many programs as possible for the size of the region Y are displayed in the region Y.

In the region Y of FIG. 5A, for each program, a broadcast channel number of the program, what is called a station logo that symbolizes a broadcasting station, a program title, and a broadcast time are displayed from the left. The programs displayed in the region Y are programs that are scheduled to be broadcast from the present time onward.

In this example, the cursor 100Y in the region Y is located at "program B" that will be broadcast in a time zone of AM 8:00 to AM 9:00 on channel 11. The cursor 100X2 in the region X2 is located at the position corresponding to AM 8:00 which is the broadcast start time of "program B" and numeral "8" indicating eight to nine hours is highlighted in the cursor 100X2.

FIG. 5B shows a state that is changed from the state of FIG. 5A and in which the cursor 100Y is moved to the position of "program L" of channel 18.

The above type of vertical, line-by-line basis movement of the cursor 100Y in the region Y, for instance, is effected by manipulating the up button switch 124 and the down button switch 125 of the remote controller 4A shown in FIG. 4. For example, the cursor position is moved upward or downward by one line every time the up button switch 124 or the down button switch 125 is pushed once. Further, by manipulating the up button switch 124 when the cursor 100Y, for instance, is located at the top line or manipulating the down button switch 125 when the cursor 100Y is located at the bottom line, the display contents can be scrolled in such an image that the cylinder EPG (see FIG. 3) is rotated.

This type of scrolling can be effected not only in the region Y but also in the regions X1, X2, and Z in a state that one of those regions is selected and the cursor 100X1, 100X2, or 100Z is rendered movable, as described later in connection with FIGS. 6A-1 to 6E.

"Program L" will be broadcast in a time zone of AM 9:00 to AM 9:30. Therefore, when the cursor 100Y is moved to the position of FIG. 5B, the cursor 100X2 is accordingly moved to a position that is near the position of AM 9:00 and approximately corresponds to the broadcast start time of "program L" and numeral "9" indicating nine to ten hours is highlighted as shown in FIG. 5B.

FIG. 5C shows a state that is changed from the state of FIG. 5B and in which the cursor 100Y is moved to a position of an even later time zone. In this example, the cursor 100Y is located at the position of "program U" which will be broadcast in a midnight time zone of AM 0:10 to AM 2:20 on channel 14. In this case, similarly, the cursor 100X2 is moved to a position that is near the position of AM 0:00 and approximately corresponds to the broadcast start time of "program U" and numeral "24" indicating zero to one hour is highlighted.

The broadcast time AM 0:10 to AM 2:20 of "program U" belongs to the next day, i.e., the fourth day, Monday. Therefore, the cursor 100X1 is moved from the position of the third day, Sunday shown in FIGS. 5A and 5B to the position of the next day, i.e., the fourth day, Monday.

Consider a case that the cursor 100Y is moved from the position of FIG. 5C to a position of an even later time zone, i.e., the position of "program S" which will be broadcast in a time zone of AM 1:30 to AM 3:30 on channel 12 as shown in FIG. 5D.

In this case, the cursor 100X2 in the region X2 is moved to a position that is near the position of AM 1:00 and approximately corresponds to the broadcast start time of "program S" and numeral "1" indicating one to two hours is highlighted. The cursor 100X1 in the region X1 is moved to the position of the fifth day, Tuesday.

The variations in display mode in association with the cursor movements in the region Y have been described above in connection with FIGS. 5A–5D. Next, variations in display mode in association with cursor movements in the regions other than the region Y will be described with reference to FIGS. 6A-1 to 6E.

For example, assume a case that a program table (electrical program guide) is called by manipulating the IRD changeover button switch 114B and the program table button switch 123 in a state that a user is viewing a program by selecting channel 11, a program table is displayed on the display screen of the television monitor device 10 as shown in FIG. 6C. That is, the program table is displayed so as to be superimposed on a program picture of channel 11 that is currently selected.

The program table of FIG. 6C is in the same state as that of FIG. 5A. That is, the region Y is selected and hence only the cursor 100Y can be moved by a user's manipulation (the cursors in the other regions X1, X2, and Z are not movable by a manipulation).

As described above, an information item of the selected channel region $Z_{CH}$ is provided in the region Z. In this case, the selected channel region $Z_{CH}$ is an item (one of genre choices) for indicating the channel number of a program that is currently selected by the tuner 2 and displayed on the display screen as a background of the program table. Therefore, the channel number indicated in the selected channel region $Z_{CH}$ varies depending on the currently selected channel. In the case of FIG. 6C, "11 CH" is indicated because channel 11 is currently selected.

If a user manipulates, for instance, the left button switch 126 once in the state of FIG. 6C, the program table picture is changed to a state shown in FIG. 6B-1, in which the region X2 located on the left of the region Y and indicating time is selected. In this display state, only the cursor 100X2 in the region X2 is movable (the cursors in the other regions are not movable).

By manipulating the up button switch 124 or the down button switch 125 in the state of FIG. 6B-1, the cursor 100X2 can be moved to an arbitrary position in the vertical direction and a new time point can thereby be designated. For example, FIG. 6B-2 shows a state that the designated time has been changed from "8 hours" to "9 hours" by pushing the down button switch 125 once in the state of FIG. 6B-1.

When the designated time is changed in the above manner, the display contents of the region Y (not shown) are changed so that a plurality of programs that will be broadcast in the nine to ten hours and thereafter are indicated as candidates.

If the left button switch 126 is pushed once in the state of FIG. 6B-1, a display state of FIG. 6A-1 is established in which the region X1 for displaying dates is selected and hence only the cursor 100X1 is rendered movable (the cursors in the other regions are not movable). In this case, the state of the region X2 remains the same as shown in FIG. 6B-1.

In the state of FIG. 6A-1, a new date can be designated by moving the cursor 100X1 vertically by manipulating the up button switch 124 or the down button switch 125. FIG. 6A-2 shows a state that the fourth day, Monday has been newly designated by pushing the down button switch 125 once.

Also in this case, the display contents of the region Y are changed so that programs to be broadcast from the fourth day, Monday onward.

Every time the right button switch 127 is pushed starting from the state of FIG. 6A-1, the selected region is changed to the region of FIG. 6B-1, then to the region of FIG. 6C so as to correspond to the highlighted position. If the right button switch 127 again is pushed in the state of FIG. 6C, a state of FIG. 6D-1 is established in which the region Z for displaying genres is selected and hence only the cursor 100Z is rendered movable (the cursors in the other regions are not movable).

In this state, similarly, an arbitrary genre can be selected by moving the cursor 100Z by manipulating the up button switch 124 or the down button switch 125. In this example, switching is made from the state of FIG. 6D-1 in which "all" is designated to a state of FIG. 6D-2 in which the selected channel region $Z_{CH}$ is designated that indicates "11 CH."

Figure 2:
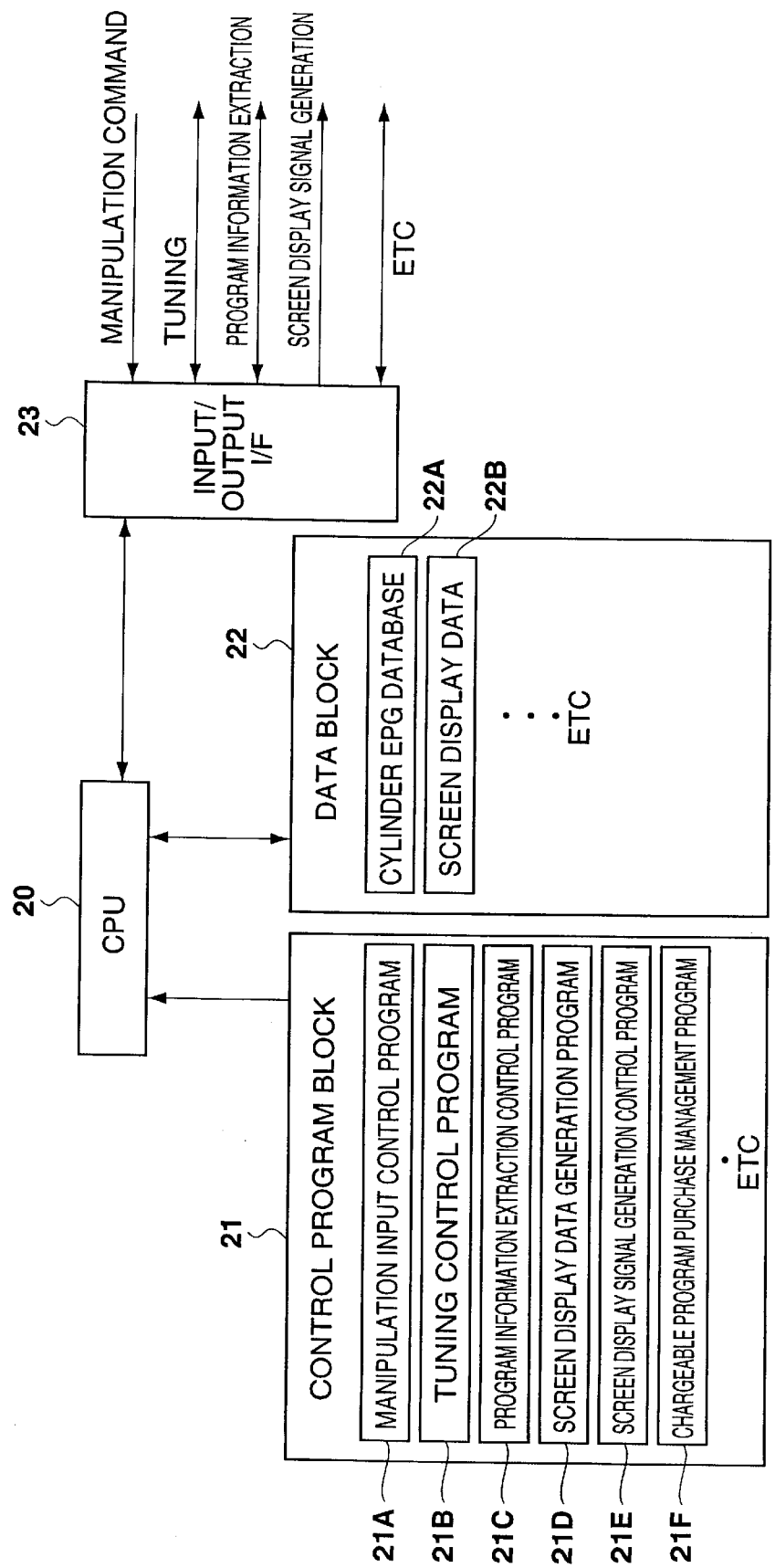
FIG. 2 is a block diagram showing an internal configuration example of an internal control microcomputer.

In the state of FIG. 6D-2 in which the cursor 100Z is located at the selected channel region $Z_{CH}$ indicating "11 CH," the display contents of the program table region Y are changed to ones as shown in FIG. 6E, for instance. The program table of FIG. 6E is in a state that the region Y is selected and hence the cursor 100Y is rendered movable.

In this case, in the region Y of the program table of FIG. 6E, a plurality of programs to be broadcast from AM 8:00 onward on channel 11 are displayed in order of their broadcast start times. This allows a user to recognize the contents of programs to be broadcast from the current time onward on the channel that is currently selected and viewed. That is, in the embodiment, by performing a manipulation for designating a genre in the region Z, the program table can be used as a program table of a selected broadcast channel as well as a user can recognize program candidates belonging to a selected "genre" (in the sense of ordinary use of this word; movies, news, or the like).

Where the item "bookmark" is selected in the region Z, program titles with bookmarks are displayed in the region Y in order of broadcast times, for instance, in a manner described later.

If the left button switch 126 is manipulated successively starting from the state of FIG. 6D-1, the selected region is changed in order of FIGS. 6C, 6B-1, and 6A-1.

In the receiving apparatus of the embodiment, the electronic program guide display is performed as described above. A user can perform manipulations for selecting a desired program from among programs presented in the region Y of a program table, which manipulations are such that the user moves the cursor 100Y to the position of a desired program in the region Y and then pushes the select button switch 128 shown in FIG. 4.

For example, if a program selected by the user by the above selecting manipulations is currently being broadcast and is not a PPV program (it is a free program or a program of a subscribed chargeable channel), the program table that has been displayed on the television monitor device 10 is erased and switched to a broadcast picture of the selected program. Thus, the user can watch the selected program.

On the other hand, if a program selected by using a program table is not a PPV program and is not being currently broadcast (that is, it is scheduled to be broadcast in the future), switching is made from the program table to an information picture of the selected program. The contents of the program information picture may be the date and time of the program, its general content (outline), and other various items.

If a program selected by using a program table is a PPV program, a purchasing picture for PPV program purchase will be displayed in a manner described below, for instance. Or a preview picture will be displayed.

A PPV purchasing picture or a preview picture is displayed not only when a PPV program is selected on an electronic program guide (program table) as described above, but also when a user selects a channel on which a PPV program is broadcast by manipulating the numeral button switches 118, the channel up/down button switch 130, etc. of the manipulation section 4 (remote controller 4A).

4. Display Mode Example of PPV Program Purchasing Picture of Embodiment

The preview will be described first, which is one mode of a PPV program purchasing picture. For example, when a user selects a certain PPV program, its scrambling is temporarily canceled to allow its picture (and sounds) to be reproduced normally. Thus, the user can recognize the content of the selected PPV program by watching the preview picture, as an effective material for judging whether to purchase it. If the user wants to watch the previewed PPV program by regularly purchasing it, he can decide the purchase by, for instance, performing a necessary manipulation according to a guide displayed in the preview picture.

In the embodiment, purchase of a PPV program concerned is decided by manipulating the select button switch (decision key) 128 of the manipulation section 4 (remote controller 4A).

After the purchase of the program has been decided in the above manner, the CPU 20 executes the chargeable program purchase management program 21F, whereby the descrambler 12 in the video signal reproduction circuit 7 is allowed to operate until the broadcast end time of the PPV program. Thus, the video signal reproduction circuit 7 outputs video data while descrambling it and hence the PPV program is displayed on the display screen of the monitor device 10 in a normal state (scramble-canceled state). Further, when purchase of a PPV program is decided in the above manner, the fact of the purchase is stored in the IC card 13 as PPV program viewing history data.

The viewable time of one preview watching event and the maximum allowable number of times of consecutive preview watching events are preset on the transmission side. For example, if the predetermined time of one preview watching event is elapsed or if the number of times of consecutive preview watching events exceeds the predetermined number, the preview operation is finished and a scrambled state is established again.

The above preview operation is realized such that the IC card 13 captures preview control information that is transmitted from the transmission side. For example, the IC card 13 captures preview-related data (preview information data) including the one preview time and the maximum number of times of preview watching events of a PPV program concerned from among control information of respective programs.

When the PPV program is selected, the IC card 13 (see FIG. 1) transmits a scramble key to the descrambler 12 for a given time based on the preview information data of this PPV program stored in the IC card 13, to enable scramble cancellation. If a preview is still requested after the IC card 13 has transmitted the scramble key to the descrambler 12 at the maximum allowable number of times of preview watching events, the IC card 13 no longer transmits the scramble key to the descrambler 12. For example, this control is realized such that the CPU 20 (see FIG. 2) exchanges data with the IC card 13 based on the chargeable program purchase management program 21F.

The process of displaying a guide necessary for purchasing a program during display of a preview picture is realized such that the CPU 20 executes a proper program in the control program block 21.

Figure 7:
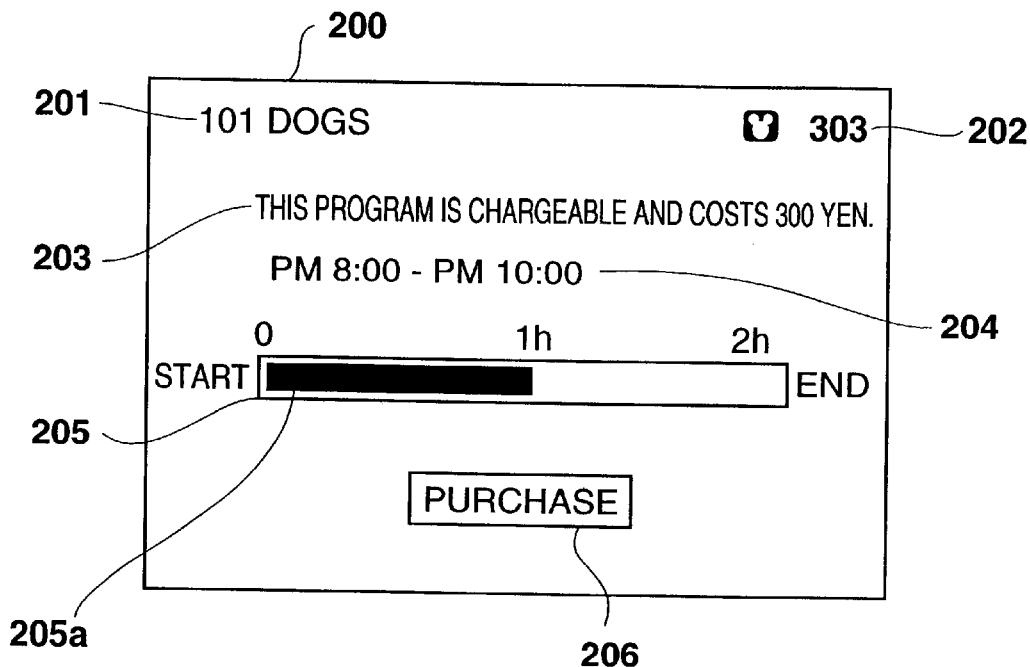
FIG. 7 shows a display mode example of a first purchasing picture for PPV program purchase according to the embodiment.
Figure 8:
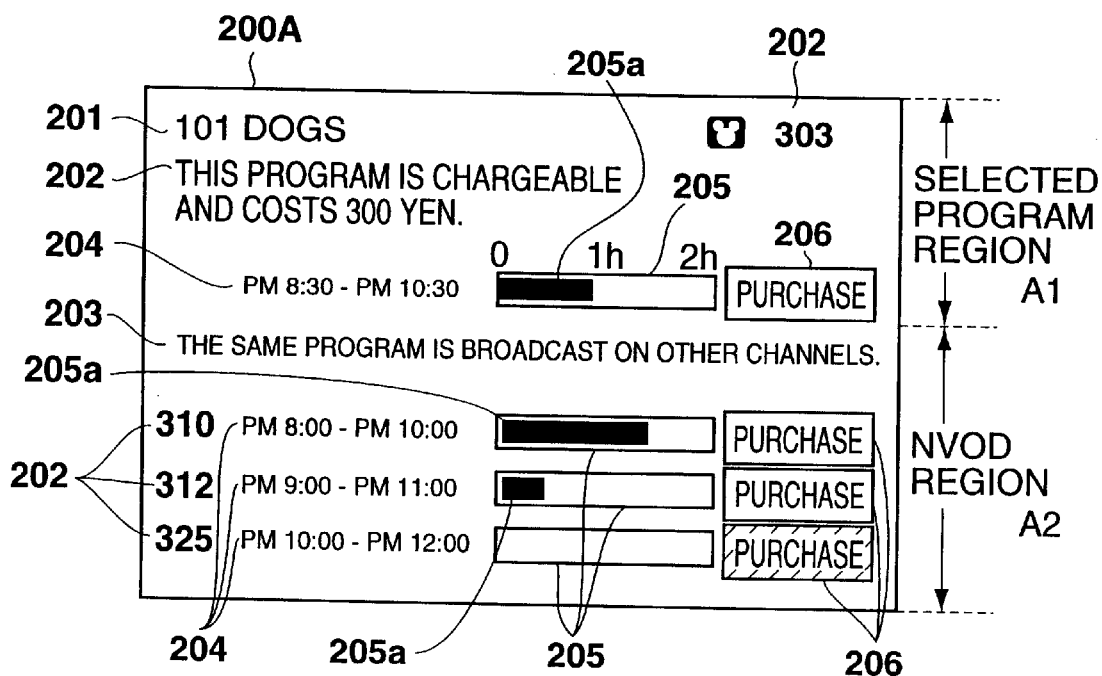
FIG. 8 shows a display mode example of a second purchasing picture for PPV program purchase according to the embodiment.

FIGS. 7 and 8 show display mode examples of PPV program purchasing pictures according to the embodiment. There are PPV programs for which no preview is set. The PPV program purchasing pictures of this embodiment shown in FIGS. 7 and 8 are displayed when a PPV program for which no preview is set is selected.

FIG. 7 shows a display mode example of a first PPV purchasing picture 200, which is displayed when a selected PPV program does not accommodate NVOD, that is, when no PPV programs having the same contents as the selected PPV program are or will not be presented on other channels.

In the first PPV purchasing picture 200 shown in FIG. 7, the program title of a selected PPV is displayed in a program title display region 201 and a broadcast channel is displayed in a broadcast channel display region 202. In this example, "101 dogs" is displayed in the program title display region 201 and channel number "303" is displayed in the broadcast channel display region 202 together with a channel logo as a symbol mark of that channel.

Information relating to the selected program, in this case a message "This program is chargeable and costs 300 yen." is character-displayed in a program information display region 203. The broadcast time zone of the selected program, in this case, "PM 8:00–PM 10:00" which indicates a two-hour broadcast time zone, is displayed in a broadcast time zone display region 204.

A time display bar 205 is displayed under the broadcast time zone display region 204. The time display bar 205 graphically indicates a ratio of an already broadcast time of the selected PPV program until the present time to the total broadcast duration. In this example, the time display bar 205 is a bar along the horizontal direction. The length of the entire bar that is displayed as a white frame in FIG. 7 corresponds to the total broadcast duration "two hours" of the selected program. An elapsed time indication bar 205a that is displayed in black in the white frame bar 205 indicates an already broadcast time until the present time.

In this example, the present time is about PM 9:00. The elapsed time indication bar 205a extends approximately to the center of the white frame bar 205, and hence indicates that the selected program has already proceeded for about one hour, i.e., approximately a half of the total broadcast duration.

By looking at such a time display bar 205, a user can visually recognize how the selected program has proceeded in time without comparing the present time that is recognized by looking at a clock, for instance, and information of a broadcast time zone displayed on a purchasing picture.

In this example, since the selected PPV program "101 dogs" has already been broadcast for one hour from its start and the residual broadcast time is only about one hour, i.e., approximately a half of the total broadcast duration, probably the user will not purchase this PPV program. By virtue of the graphical display of the progress in time of the PPV program by means of the time display bar 205 of the embodiment, the possibility of erroneous purchase of this PPV program due to, for instance, the user's failure in judging the relationship between the present time and the broadcast time zone of the PPV program is considerably reduced.

To switch from the above-described state in which the purchasing picture is displayed to another picture such as an ordinary picture or a program table with a judgment of not purchasing the PPV program, a proper manipulation for switching to another picture may be performed on the manipulation section 4 (remote controller 4A).

A purchase button 206 having a button shape, for instance, is displayed under the time display bar 205, and allows the user to purchase the PPV picture that is made a subject of purchase by the purchasing picture under consideration. For example, when the user wants to purchase the PPV program that is presented by the first PPV purchasing picture 200, he needs to manipulate the select button switch (decision key) of the manipulation section 4 (remote controller 4A). This manipulation is regarded as a manipulation on the purchase button 206 in the first PPV purchasing picture 200 and the purchase of the PPV program concerned is decided.

After the purchase of the program has been decided in the above manner, the CPU 20 executes the chargeable program purchase management program 21F, whereby the descrambler 12 in the video signal reproduction circuit 7 is allowed to operate. Thus, the video signal reproduction circuit 7 outputs video data while descrambling it, whereby the PPV program is displayed on the display screen of the monitor device 10 in a normal state (scramble-canceled state). If a manipulation for PPV program purchase is performed on the first PPV purchasing picture 200 shown in FIG. 7, a scramble-canceled picture of "101 dogs" will be displayed on the display screen of the monitor device 10.

When the purchase of the PPV program is decided in the above manner, the fact of the purchase is stored in the IC card 13 as viewing history data.

FIG. 8 shows a second purchasing picture 200A as another PPV purchase purchasing picture according to the embodiment.

The second purchasing picture 200A is displayed when a PPV program selected by a user accommodates NVOD, that is, when PPV programs having the same contents as the selected PPV program are or will not be presented on other channels.

The parts in FIG. 8 that are the same as in FIG. 7 are given the same reference numerals and redundant descriptions therefor will be omitted.

In the second purchasing picture shown in FIG. 8, the entire display area is divided into a selected program area A1 and a NVOD area A2. In the selected program area A1, information relating to a user-selected PPV program itself is displayed in a display mode similar to that of FIG. 7. In this example, for the reasons of a display space etc., a broadcast time zone display region 204, a time display bar 205, and a purchase button 206, for instance, are displayed so as to be arranged side by side in the horizontal direction.

In the NVOD area A2 located under the selected program area A1, a user is informed of the fact that the same program is or will be broadcast on other channels by means of a character display such as "The same program is broadcast on other channels."

In the NVOD area A2 shown in FIG. 2, information on three PPV programs (in this case, "101 dogs") that are or will be broadcast on other channels is presented as other candidates of the same PPV program of NVOD.

In this example, a broadcast channel display region 202, a broadcast time zone display area 204, a time display bar 205, and a purchase button of each of the three candidate programs of NVOD are arranged side by side in the horizontal direction.

Specifically, in the state that the second purchasing picture 200A of FIG. 8 is displayed, the present time is about PM 9:30. In the time display bar 205 of the PPV program displayed in the selected program area A1 and that of each of the three PPV programs presented in the NVOD area A2, an elapsed time indication bar 205a whose length indicates progress of the program until the present time is displayed in accordance with its broadcast start time that is specific to the program concerned. Since the PPV program "101 dogs" that is scheduled to be broadcast in a broadcast time zone PM 10:00 to PM 12:00 on channel 325 has not been broadcast yet at present, no elapsed time indication bar 205a is not displayed in the associated time display bar 205.

Assume that by looking at the second purchasing picture 200A a user has made a judgment of purchasing and viewing, for instance, the PPV program "101 dogs" that will be broadcast from PM 10:00 to PM 12:00 on channel 325.

Since the second purchasing picture 200A includes a plurality of PPV program candidates, the receiving apparatus is so constructed that the user can select one of the four purchase buttons 206 shown in FIG. 8 by manipulating the up button switch 124 and the down button switch 125 of the manipulation section 4 (remote controller 4A). Therefore, the user selects the purchase button 206 of the PPV program that will be broadcast on channel 325 by manipulating the up button switch 124 and the down button switch 125. In FIG. 8, the purchase button 206 of channel 325 is hatched, which indicates that the selected purchase button is emphasized in a predetermined manner.

After confirming that the purchase button 206 corresponding to the PPV program of the desired candidate channel 325 is selected, the user manipulates the select button switch (decision key) 128. As a result, it is considered that the purchase button 206 of the PPV program to be displayed on channel 325 has been manipulated, and the purchase of the PPV program has been decided.

The user will be able to view the (scramble-canceled) PPV program "101 dogs" from PM 10:00 on channel 325.

The fact of the purchase of this PPV program is stored in the IC card 13 as viewing history data.

In the first and second purchasing pictures 200 and 200A shown in FIGS. 7 and 8, respectively, information items to be displayed in the respective regions, such as program titles, broadcast channels, and broadcast time zones, are generated as picture display data by referring to program information data (cylinder EPG database 22A) that are extracted from received broadcast waves. In this embodiment, the generation of such picture display data for a purchasing picture is performed by the CPU 20 based on the screen display data generation program 21D.

5. Process of Program Purchasing Based on PPV Program Purchasing Picture of Embodiment A process that is executed in displaying a PPV program purchasing picture shown in FIG. 7 or 8 or a preview picture and allowing a user to purchase a PPV program on the purchasing picture will be described with reference to a flowchart of FIG. 9. This process is realized such that the CPU 20 (see FIG. 2) properly executes necessary programs that are prepared in the control program block 21.

Figure 9:
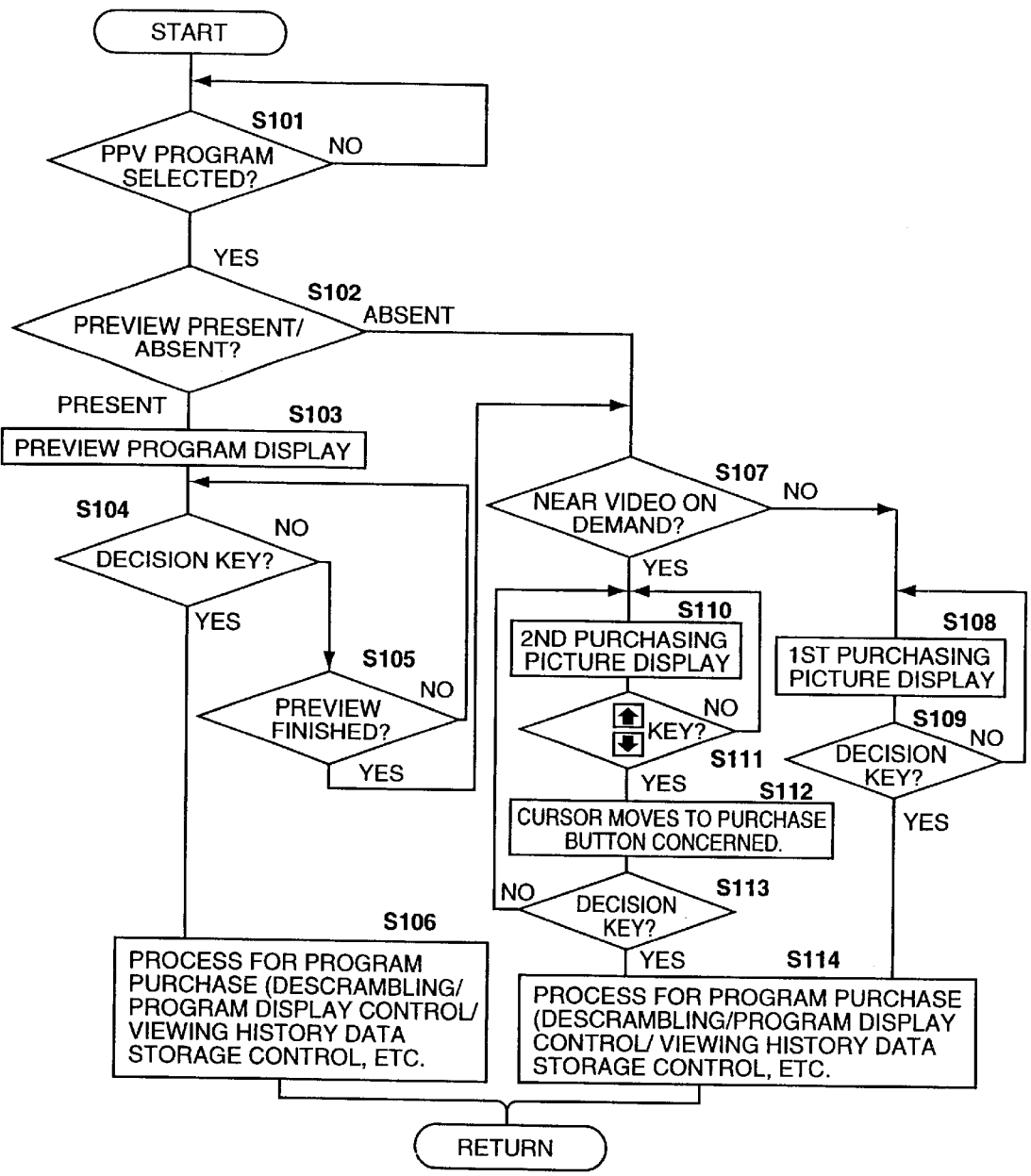
FIG. 9 is a flowchart showing a process according to the embodiment that is executed in purchasing a PPV program.

In the routine shown in FIG. 9, first, at step S101, waiting is made until selection of a PPV program. The process goes from step S101 to S102 when a user selects a PPV program by a manipulation on a program table in the manner as described above or he selects aa channel on which a PPV program is broadcast by manipulating the numeral button switches 118 and the channel up/down button switch 130 of the manipulation section 4 (remote controller 4A).

At step S102, it is judged whether a preview exists for the currently selected PPV program and whether the preview is made effective at the present time. That is, it is judged whether a preview is set for the currently selected PPV program and whether, if the allowable number of previews is predetermined, the number of preview events that have been performed for the PPV program concerned is less than the predetermined number. If it is judged at step S102 that the preview of the selected PPV program is effective, the program goes to step S103. On the other hand, if it is judged at step S102 that the preview of the selected PPV program is not effective, the process goes to step S107.

At step S103, a control for displaying a preview picture is performed, which is a process of selecting the channel of the selected PPV program by the tuner 2 and displaying a picture of this channel on the monitor device 10. As a result, a preview picture is displayed on the display screen of the monitor device 10. If the preview broadcast is associated with sound outputs, the audio signal system is also controlled to output sounds from the speakers.

After the execution of step S103, it is judged at step S104 whether the select button switch (decision key) 128 has been manipulated. It is judged at step S104 that the select button switch (decision key) 128 has not been manipulated, the process goes to step S105, where it is judged whether the preview has finished because the predetermined time has elapsed. If it is judged at step S105 that the preview has not finished, the process returns to step S104. On the other hand, if it is judged at step S105 that the preview has finished, the process goes to step S107.

If it is judged at step S104 that the select button switch (decision key) 128 has been manipulated, that is, purchase of the PPV program has been decided, the process goes to step S106, where a program purchase process is executed.

Specifically, the program purchase process is such that after causing the tuner 2 to select the channel of the selected PPV program if necessary, a control is made to cancel scramble of the PPV program to allow display of a normal picture. Further, another control is made to store necessary viewing history data of the purchased PPV program in the IC card 13. This process of step S106 is executed mainly based on the chargeable program purchase management program 21F in the control program block 21.

At step S107, it is judged whether PPV program candidates of NVOD having the same contents as the selected PPV program are scheduled to be broadcast on other channels. This judgment process is performed, for instance, such that the CPU 20 recognizes presence/absence of the same PPV programs as the selected PPV program by referring to electrical program guide data. If it is judged at step S107 that there exist no PPV programs of NVOD that are the same as the selected PPV program, the process goes to step S108, where a control for displaying the first purchasing picture shown in FIG. 7 is made.

At step S109, waiting is made until manipulation of the select button switch (decision key) 128. If it is judged at step S109 that the select button switch (decision key) 128 has been manipulated, the process goes to step S114, where a program purchase process is executed which is similar to the above-described process of step S106.

If it is judged at step S107 that the same PPV programs of NVOD exist, the process goes to step S110, where a control for displaying the second purchasing picture is performed. At the next step S111, waiting is made until manipulation of the up button switch 124 or the down button switch 125. If it is judged at step S111 that the up button switch 124 or the down button switch has been manipulated, the process goes to step S112, where a display control process is executed to move the emphasized display item upward or downward so as to select a purchase button corresponding to the manipulation of the up button switch 124 or the down button switch 125.

At step S113, waiting is made until manipulation of the select button switch (decision key) 128. If it is judged at step S113 that the select button switch (decision key) 128 has been manipulated, the process goes to step S114, where a program purchase process is executed which is also similar to the above-described process of step S106. For example, a PPV program candidate of NVOD that is not broadcast at the present time is purchased, a scramble key for canceling the scramble of the purchased PPV program will be obtained from control information that will be transmitted together with a video signal of the PPV program after the broadcast of the purchased PPV program is started.

Although not shown in the flowchart of FIG. 9, if a user performs a certain manipulation to display another picture, the execution of the routine of FIG. 9 is immediately stopped to finish the display of a purchasing picture and a process for displaying a picture corresponding to the manipulation of the user is started.

The above embodiment is directed to the case where the purchasing pictures of FIGS. 7 and 8 are displayed when a preview is not effective. However, from the viewpoint of facilitating visual recognition of the progress in time of a PPV program purchase of which is now being considered by a user, it is preferable to display a purchasing-picture-like image that is according to the display mode of FIG. 7 or 8. Naturally this type of modification is possible.

However, since the main purpose of the preview is to provide a user with a material for judging whether to purchase a picture (and sounds) of a PPV program, if a purchasing-picture-like image overlaps with a preview picture of the PPV program to reduce its information amount, the intended purpose of the preview is not attained. Therefore, even if a purchasing picture having a time display bar(s) 205 is displayed only when a preview is not effective as in the case of the embodiment, in can be said that no problems would occur in consideration of the mode of actual use of the IRD Further, in the invention, the purchasing pictures are not limited to those of FIGS. 7 and 8 and various modifications are possible in accordance with the mode of actual use and convenience in design, and other factors. Further, the graphic display relating to the progress of a PPV program is not limited to a bar-type display like the time display bar(s) 205 shown in FIGS. 7 and 8 and various modifications are possible such as a pie-graph-like display and a meter-like display.

As described above, according to the invention, the progress in time of a PPV program is graphically displayed (with a bar display or the like) in a purchasing picture, for instance, which allows a user to immediately and visually recognize such information as an elapsed broadcast time and a residual broadcast time of a selected PPV program. This considerably reduces the possibility that the user performs a manipulation of erroneously purchasing this program in spite of the fact that it has already been broadcast for a long time, for instance, due to misunderstanding of the relationship between the present time and the broadcast time zone of the selected PPV program. This means improvement in the ease of operation to a user.

Where a selected PPV program accommodates NVOD, a purchasing picture of the above display mode is modified so that the above information is displayed not only for the selected PPV program itself but also for NVOD purchase candidates of the same program to be broadcasted on different channels. Thus, an effective user interface can be obtained.

What is claimed is:

1. A receiving apparatus which receives transmitted program information of a plurality of programs together with transmitted video and audio signals thereof, comprising:

selecting means for selecting a desired program from among the plurality of programs; and chargeable program information display control means for displaying information relating to a chargeable program that is selected by a given user operation from among programs selectable by the selecting means, the chargeable program information display control means concurrently displaying a broadcast schedule of the selected program, an information field indicating whether the selected program is chargeable and the price thereof, and a graphic display indicating progress in time of the selected chargeable program at a current time prior to a purchase of the chargeable program, said graphic display being a display of elapsed broadcast time with respect to a total broadcast duration of the selected chargeable program;

wherein the chargeable program information display control means concurrently displays, as part of the information relating to the chargeable program, information relating to chargeable programs broadcast on other channels that have the same contents as the selected chargeable program, as well as a purchasing icon for enabling the purchase of the selected chargeable program; and wherein the chargeable program information display control means judges whether the selected chargeable program is or will be additionally broadcast by a near video on demand service on said other channels, and presents a first graphic display if it is judged that the selected chargeable program is not or will not be additionally broadcast by a near video on demand service and a second graphic display if it judged that the selected chargeable program is or will be additionally broadcast by the near video on demand service.

2. The receiving apparatus according to claim 1, further comprising program guide information extracting means for extracting program guide information that is superimposed on a broadcast wave received by the receiving means, wherein the chargeable program information display control means displays the information relating to the chargeable program based on the extracted program guide information.

3. The receiving apparatus according to claim 1, wherein the chargeable program information display control means judges whether there exists a preview relating to the selected chargeable program, and presents the graphic display if it is judged that there is no preview.

4. A display control method for a receiving apparatus which receives transmitted program information of a plurality of programs together with transmitted video and audio signals thereof and displays program information of a selected program, the display control method comprising the steps of:

determining whether a chargeable program has been selected by a given user operation;

presenting a graphic display indicating progress in time of the selected chargeable program at a current time prior to a purchase of the chargeable program if it is determined that the chargeable program has been selected, said graphic display being a display of elapsed broadcast time with respect to a total broadcast duration of the selected chargeable program;

concurrently displaying, on a screen with said graphic display, a broadcast schedule of the selected program, an information field indicating whether the selected program is chargeable and the price thereof, and information relating to chargeable programs broadcast on other channels that have the same contents as the selected chargeable program, as well as a purchasing icon for enabling the purchase of the selected chargeable program;

judging whether the selected chargeable program is or will be additionally broadcast by a near video on demand service on other channels; and presenting a first graphic display if it is judged that the selected chargeable program is not or will not be additionally broadcast by a near video on demand service and a second graphic display if it is judged that the selected chargeable program is or will be additionally broadcast by the near video on demand service.

5. The display control method according to claim 4, further comprising the step of extracting program guide information that is superimposed on a received broadcast wave, wherein the presenting step displays the information relating to the chargeable program based on the extracted program guide information.

6. The display control method according to claim 4, further comprising the steps of:

judging whether there exists a preview relating to the selected chargeable program; and presenting the graphic display if it is judged that there is no preview.

7. A receiving apparatus which receives transmitted program information of a plurality of programs together with transmitted video and audio signals thereof, comprising:

selecting means for selecting a desired program from among the plurality of programs; and chargeable program information display control means for displaying information relating to a chargeable program that is selected by a given user operation from among programs selectable by the selecting means, the chargeable program information display control means concurrently displaying a broadcast schedule of the selected program, an information field indicating whether the selected program is chargeable and the price thereof, and a graphic display indicating progress in time of the selected chargeable program at a current time prior to a purchase of the chargeable program, said graphic display being a display of elapsed broadcast time with respect to a total broadcast duration of the selected chargeable program;

wherein the chargeable program information display control means concurrently displays, as part of the information relating to the chargeable program, information relating to chargeable programs broadcast on other channels that have the same contents as the selected chargeable program, as well as a purchasing icon for enabling the purchase of the selected chargeable program, and further displays a plurality of time bars in addition to the graphic display indicating progress in time of the selected chargeable program, with each time bar associated with a near video on demand (NVOD) program broadcast of the same contents as said selected chargeable program on a respective channel and at a respective time and each time bar indicating progress in time of the associated NVOD program, and with respective purchasing icons displayed in association with the NVOD programs of the same contents to enable a purchase of the program on the channel corresponding thereto by a selection of one of said purchasing icons.

8. A display control method for a receiving apparatus which receives transmitted program information of a plurality of programs together with transmitted video and audio signals thereof and displays program information of a selected program, the display control method comprising the steps of:

determining whether a chargeable program has been selected by a given user operation;

presenting a graphic display indicating progress in time of the selected chargeable program at a current time prior to a purchase of the chargeable program if it is determined that the chargeable program has been selected, said graphic display being a display of elapsed broadcast time with respect to a total broadcast duration of the selected chargeable program;

concurrently displaying, on a screen with said graphic display, a broadcast schedule of the selected program, an information field indicating whether the selected program is chargeable and the price thereof, and information relating to chargeable programs broadcast on other channels that have the same contents as the selected chargeable program, as well as a purchasing icon for enabling the purchase of the selected chargeable program; and displaying a plurality of time bars in addition to the graphic display indicating progress in time of the selected chargeable program, with each time bar associated with a near video on demand (NVOD) program broadcast of the same contents as said selected chargeable program on a respective channel and at a respective time and each time bar indicating progress in time of the associated NVOD program, and displaying respective purchasing icons in association with the NVOD programs of the same contents to enable a purchase of the program on the channel corresponding thereto by a selection of one of said purchasing icons.

9. The receiving apparatus according to claim 7, wherein said time bars are displayed on a screen without any concurrent display of any other time bar of a program having different content than said selected chargeable program.

10. The display control method according to claim 8, wherein said time bars are displayed on a screen without any concurrent display of any other time bar of a program having different content than said selected chargeable program.

* * * * *